United States Patent [19]

Petzinger

[11] 4,346,002
[45] Aug. 24, 1982

[54] WATERLESS VACUUM TOILET

[76] Inventor: Manfred W. A. Petzinger, Rte. 7, Box 87, Elizabethtown, Ky. 42701

[21] Appl. No.: 251,023

[22] Filed: Apr. 3, 1981

Related U.S. Application Data

[63] Continuation of Ser. No. 72,381, Sep. 4, 1979, abandoned.

[51] Int. Cl.³ .................... A47K 11/02; C05F 9/04
[52] U.S. Cl. ........................ 210/202; 210/218; 4/111.1; 4/449; 4/DIG. 12; 71/9
[58] Field of Search ............ 210/612, 613, 218, 200, 210/201, 202; 406/198, 197, 108, 187; 4/484, 111.1, 111.5, 449, 479, DIG. 12; 71/9, 13

[56] References Cited

U.S. PATENT DOCUMENTS

| | | | |
|---|---|---|---|
| 387,104 | 7/1888 | Paynter | 34/24 |
| 1,415,007 | 5/1922 | Ball | 210/218 |
| 3,136,608 | 6/1964 | Lindstrom | 210/218 |
| 3,422,985 | 1/1969 | Rinehart | 229/53 |
| 3,457,567 | 7/1969 | Criss | 4/484 |
| 3,546,718 | 12/1970 | Minnitte | 4/449 |
| 3,648,302 | 3/1972 | Winters | 4/484 |
| 3,663,970 | 5/1972 | Drouhard et al. | 4/111.1 |
| 3,666,106 | 5/1972 | Green | 210/201 |
| 3,720,962 | 3/1973 | Harrah | 4/249 |
| 3,728,254 | 4/1973 | Carothers | 210/602 |
| 3,892,660 | 7/1975 | Romell | 210/612 |
| 4,025,969 | 5/1977 | Dahlen | 4/484 |
| 4,120,312 | 10/1978 | Michael | 4/431 |
| 4,172,034 | 10/1979 | Carlsson et al. | 210/197 |
| 4,254,515 | 3/1981 | Kiyama et al. | 4/DIG. 12 |
| 4,285,719 | 8/1981 | Criss | 210/602 |

OTHER PUBLICATIONS

Compost Science, Journal of Waste Recycling, May–Jun. 1972, vol. 13, No. 3.

Primary Examiner—Benoit Castel
Attorney, Agent, or Firm—Darrell E. Hollis

[57] ABSTRACT

An improved waterless toilet for aerobic biological transformation of organic waste material is disclosed. The toilet is located at a position remote from a compartment wherein waste material is aerobically transformed. The toilet is connected to the compartment by a conduit. Organic waste is deposited into the toilet and a subsequently applied vacuum aids in the transporting of the waste material through the conduit to the compartment. Prior to depositing organic waste material into the toilet, a cup-shaped paper wrapping means is inserted into the toilet. Thereafter the vacuum is applied to the paper wrapping means and waste material to cause the paper wrapping to close around the waste material as it enters the conduit. Utilizing paper wrapping means, the toilet is protected from soiling by the organic waste material when it is deposited in the toilet. Furthermore, the paper wrapping means protects the conduit from soiling, it acts to clean the interior of the conduit by a wiping action during transport of the wrapper and its included organic waste material through the conduit to the compost compartment.

4 Claims, 6 Drawing Figures

WATERLESS VACUUM TOILET

This application is a continuation of application Ser. No. 072,381 filed Sept. 4, 1979, now abandoned.

The present invention relates to a method for an aerobic biological transformation of organic waste material and, more particularly, to an improved method of transporting human waste without the use of water.

It is well known in the prior art methods of aerobic biological transformation of organic waste material to locate a toilet at a position remote from a compartment where the waste material is aerobically transformed. The toilet means of the prior art is connected to the compartment by a conduit for carrying organic waste material from the toilet to the compartment. Furthermore, it is known in the art to use a vacuum in conjunction with the conduit to aid in the transportation of the waste material through the conduit to the compartment.

More specifically the prior art has disclosed essentially three different ways in which human waste is transported from a toilet to the compartment where it is aerobically transformed. One such prior art method involves the use of suction and/or vacuum with the use of water as a transporter and pipe cleaner to keep the pipes clear and prevent stoppages. See for example U.S. Pat. Nos. 3,663,970 and 3,720,962 and an article by Hills, Lawrence C., "The Clivus Toilet-Sanitation without Pollution" Compost Science, Vol. 13, No. 3, May-June 1972, pp. 8–11.

A second method of human waste transportation is the gravity method with the use of water as a transporter. See U.S. Pat. Nos. 3,666,106 and 3,728,254. A third method of human waste transportation involves a free fall of the waste under gravity without the use of water. See U.S. Pat. Nos. 3,136,608, 3,422,985 and 3,546,718.

The present invention is directed to an improved apparatus for the aerobic biological transformation of organic waste material, which method uses a vacuum to transport the organic waste material away from the toilet without the use of water.

Another object of the present invention is to provide an apparatus which operates without the use of water which produces the best decaying process in a compost container.

Another object of the present invention is to provide an improved apparatus which does not use gravity or free fall method as in the prior art systems. A holding tank, or other compost containers can therefore be located relatively remote from the toilet if necessary. A further object of the present invention is to provide an improved apparatus for transportation of organic waste material which utilizes paper wrapping means for the organic waste material. These paper wrapping means are transported according to the apparatus by a vacuum and the paper provides an essential ingredient needed in the hot fermented decaying process wherein the waste material is aerobically transformed.

Still another object of the present invention is to provide an apparatus for transporting human waste while keeping the toilet and associated conduits free and clear of soiling without the use of water.

Other objects and advantage of the present invention will appear to those skilled in the art from the written description which follows:

In accordance with the present invention I provide an improvement to an apparatus for the aerobic biological transformation of organic waste material. The method comprises locating a toilet at a position relatively remote from a compartment wherein the waste material is aerobically transformed. The toilet is connected to the compartment by a conduit means. According to the method, organic waste material is deposited into said toilet and vacuum is subsequently applied to the conduit to aid in the transporting of the waste material through the conduit to the compartment. Prior to depositing the organic waste material into the toilet, I provide a cup-shaped paper wrapping means which is inserted into the toilet means. Thereafter, the vacuum is applied to cause the paper wrapping means to close around the waste material therein as the wrapping means and waste enter into the conduit under the force of the vacuum. The improved method enables the cup-shaped paper wrapping means to protect the interior of the toilet from soiling by organic waste material when the same is deposited therein. Furthermore, the paper wrapping means protects the conduit from soiling and acts to clean the interior of the conduit by wiping action during transport of the wrapping means and waste material through the conduit.

In accordance with another aspect of the present invention I provide a cup-shaped paper wrapping means which comprises a truncated cone of water absorbent paper. Attached to the lower end of the cone is a separate paper cup which is made of a paper having a relatively lower water absorbency than the paper of the upper portion of the truncated cone. In use, organic waste material is deposited into the truncated cone and additional paper material is deposited on the organic waste material prior to applying the vacuum to transport the entire wrapping and its contents away from the toilet.

According to a further aspect of the present invention, I provide a paper wrapping means which comprises a cone of water absorbent paper with the lower end or apex of the cone being thicker than the upper portion of the cone.

According to a further aspect of the present invention, I provide one or more additional funnels at positions remote from the composting compartment. The funnels are connected to the conduit which leads to the composting compartment and the funnels may be located in a kitchen or adjacent to a gardening area in a home so that decomposable garbage, cut grass, weeds and the like may be deposited in the funnels for transportation to the composting compartment.

According to another aspect of the present invention I provide an improved apparatus wherein the composting compartment is provided with means for exhausting air and water vapor from its interior wherein the waste material is aerobically transformed. The exhaust means is provided with means to prevent condensed water vapor from flowing back into the composting compartment and thereby decreasing the deficiency of the aerobic transformation process.

Figure 1:
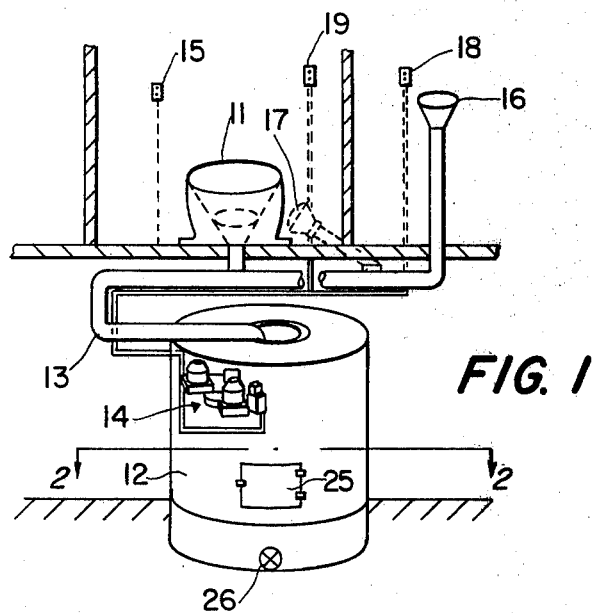
FIG. 1 illustrates one embodiment of equipment arrangement for practicing the method in accordance with the present invention.
Figure 5:
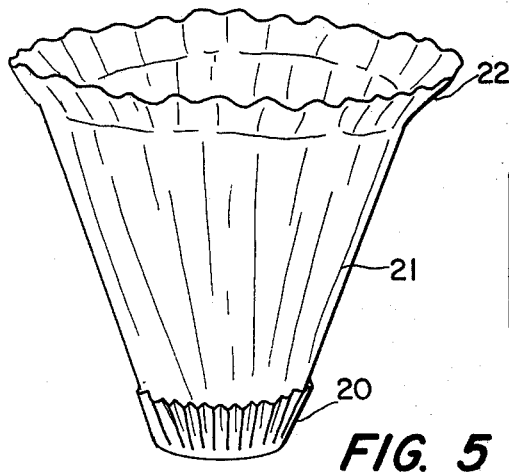
FIG. 5 illustrates one embodiment of a cup-shaped paper wrapping means for insertion into a toilet in accordance with the present invention.

For purposes of providing a generalized understanding of an apparatus for practicing the present invention, I refer to FIGS. 1 and 5. In FIG. 1, I provide a toilet means 11 which is located at a position relatively remote from a composting compartment 12 wherein waste material is aerobically transformed. The toilet means 11 is connected to compartment 12 by a conduit means 13. Compartment 12 has a means for creating a vacuum therein designated as Unit 14. The Unit 14 may be turned on and off by a switch 15 located in the bathroom area of a building.

Additional funnel means 16 and 17 may be provided to the system in the kitchen and on the exterior of the building, respectively. On/off switches 18 and 19 also would be provided in these locations so that the Unit 14 could be turned on and off from these locations in the home.

The arrangement of equipment shown in FIG. 1 is adapted for transporting human waste and keeping the conduit system free and clear without the use of water. As illustrated, the equipment is preferably installed so that the toilet funnel 11 is the closest to the compost container 12, while one or more kitchen funnels are at the end of the conduit system. Garden funnels such as funnel 17 should be connected to the conduit 13 at any point before the point of toilet connection. It should be understood that suction of wet kitchen decomposable garbage and garden scraps, such as cut grass, plants, weeds, leaves, etc. will operate to keep the conduit clear and prevent stoppages during the growing seasons.

The primary means of keeping the system clean according to the apparatus of the present invention is the way that human waste is packed in a paper, cup-shaped wrapping such as illustrated in FIG. 5. When this cup-shaped paper wrapping is inserted in toilet 11 and filled with human waste, the application of the suction action from the vacuum causes the paper wrapping means to form a paper pellet missile which is transported into the compost container through conduit 13. It should be appreciated that the cup-shaped paper wrapping means protects the interior of toilet means 11 from being soiled by the human waste when it is deposited in the wrapping means. Furthermore, it should be apparent that the paper wrapping means protects the interior of the conduit from soiling during transportation through conduit 13, the paper wrapping means acts to clean the interior of the conduit by wiping action during transport of the wrapping means and human waste through the conduit means 13.

FIG. 5 shows one embodiment of an initially cup-shaped paper wrapping means according to the method of the present invention. In making this wrapping means I used a regular papercup cake cup type paper and folded it like a cup cake cup as seen at 20 in FIG. 5. The bottom of the cup 20 has the same diameter as the inside of the conduit 13 shown in FIG. 1. I used a large paper towel and cut out a large size round disc which I shaped the same way as the paper cup cake cup 20. I then put the large sized paper towel cup 21 into the cup cake cup 20. The finished cup-shaped paper wrapping means was slightly larger and longer than the toilet funnel 11 itself and expanded into the bowl of the toilet. The cupcake cup portion 20 of the paper wrapping means, being of a relatively limited water absorbing material, in addition to the overlapping edge 22 of the towel 21, prevented the paper wrapping means from falling into the conduit 13 after being filled with human waste. The filled paper wrapping means remained in place with the center of gravity in a vertically downward position. Most of the fluid discarded escaped through the towel portion 21 and ran down inside of the conduit system. The inside pipe wall of the vertical section connected to the toilet 11 was completely wet, preparing the pellet for an easy and smooth start. The lower one-third portion (approximate) of the pellet was soaked while the middle third and upper portion had only one wet side. Toilet paper was then deposited on top of the human waste. inside of the cup-shaped paper wrapping means. The waste was thereby closed in, making the wrapping means and waste ready for launching under the action of a vacuum. The electric switch 15 is turned on to activate the vacuum unit 14 and the vacuum sets the filled paper wrapping means into motion. During the first 12 inches of downward movement into conduit 13, the initially cup-shaped paper wrapping means formed into the actual missile pellet as depicted in FIG. 6 of the drawings.

Figure 6:
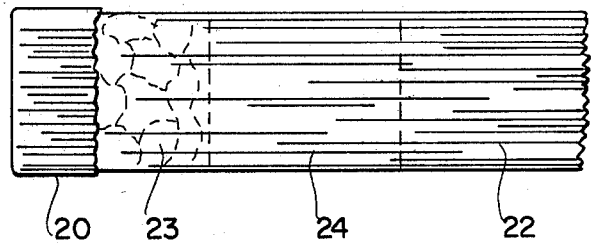
FIG. 6 illustrates the configuration of the paper wrapping means after organic waste material has been surrounded by it and the wrapping means and waste material have been drawn into the conduit leading to the compost compartment.

Referring briefly to FIG. 6, this shows the configuration of the paper wrapping and waste pellet after the vacuum has drawn it into conduit 13. The solid human waste is located in portion 23 within the interior cup 20 and cone 21. Section 24 of the pellet consists of toilet paper which is deposited into the cone on top of the human waste prior to the application of the vacuum to the toilet. Section 22 corresponds to the upper edge portion of cone 21 as seen in FIG. 5 and it has assumed a cylindrical position relative to the interior of conduit 13.

It should be noted that there are a variety of cup-shaped paper wrapping means which can be used in accordance with the apparatus of the present invention. Thus, newspaper, when folded in a certain way, will also serve as an appropriate paper wrapping means. As one particular example, I folded one-fourth of a full newspaper up to the center half of the paper. This fold provided a double wall to reinforce the pellet head. I then folded the left side at a 45 deg. angle beginning at the left bottom edge on line with the center line of the paper. The left edge then ran parallel with the top edge of the left portion of the paper. I folded the paper at approximately the half mark and continued the roll. I set the newspaper wrapping means shell in the toilet funnel and prepared it for launch, the same as the paper towel wrapping means described above. The newspaper wrapping means had a pointed head, being in conical shape, while the cupcake missile wrapping means has a flat head as depicted in the lower portion of FIG. 5. Both paper wrapping means self-destructed upon impacting inside of the composting container 12. It is worth noting that the newspaper did not absorb liquids as well as the paper towels used to prepare cone portion 21-22 of the wrapping shown in FIG. 5.

According to the present invention, the step of forming the missile pellets is the same. Thus, solid waste is squeezed together into the front portion of the paper wrapping means. Liquid did not lessen the durability of the head portion of the paper wrapping means. Toilet paper deposited in the paper wrapping means is also squeezed together and forms a spongy portion of the pellet by the wet to semi-wet middle third of the paper wrapping means. The pellet pail itself made up of the remaining one-third of the paper wrapping means as it is folded inwardly under the action of entering the smaller diameter conduit 13.

It was observed that due to the fact that the paper wrapping means was wet on one side this enabled the paper wrapping means to take the form of a cylindrical pellet with the wet side being forced inside the pellet tail. The first 12 inches of pipe hooked up to the toilet funnel is installed vertically as seen in FIG. 1 and allows the forming of the paper wrapping and waste pellet. The pellet missile being wet to semi-wet is flexible enough to travel to the compost compartment even in bends of the conduit 13. For best results, it is recommended that plastic pipe be utilized in the operation of the present ivention since the plastic pipe can be bent to change direction. The pipe bends should have as wide a radius as practical in order of further insure that the pellet will flow freely.

It should be apparent that the wet front portion and spongy middle section of the pellet as shown in FIG. 6 will enable a smooth movement into the compost compartment. The semi-dry tail 22 of the pellet will wipe most of the inside of the conduit dry and provide a self-cleaning result.

It should be apparent that dummy pellets such as a paper wrapping means filled with water-soaked newspaper can also be sent down the vacuum toilet system disclosed for additional cleaning as deemed necessary. Such dummy pellets also provide the advantage that they will supply paper which is necessary to aid in the hot fermenting decaying process in the compost compartment.

It should be apparent that a cup-shaped paper wrapping means is utilized whenever the toilet is used. I have observed that wetting the paper wrapping means down without a fill of sold waste material will enable the pellet to travel smoothly since some liquid will remain in the pellet head. This liquid served the same purpose as the solid waste in providing weight for the pellet head.

Figure 2:
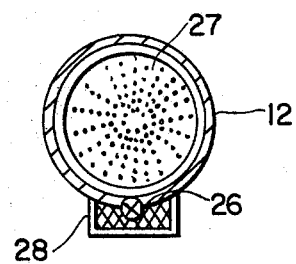
FIG. 2 is a partial sectional view of FIG. 1 and is taken along lines 2—2 in FIG. 1.

Reference is made to FIGS. 1 and 2 for an understanding of further details of construction of a system wherein the present invention can be carried out. Although FIG. 1 depicts a compost compartment 12 in the basement of a home, the compost compartment could be installed in the ground on the outside of the home. Installing compost compartment 12 in the ground would require building steps into the ground to the sap pit/compost removal door 25 to allow removal of compost and sap. Compost is removed by opening both the outer shell and inner container door. Fertilizer sap is removed by placing a pail in the sap pit and opening of the valve 26. Sap could also be pumped out of the basement.

It should be understood that the disclosed vacuum system could also be coupled with a cleaning system. Two separate pipes would then be required, one for the decomposable waste and the other for cleaning the home. Compost compartment 12 must be sealed off with a reinforced concrete cover. A four inch coupling may be installed in the center of the concrete top as depicted in FIG. 1 to allow for filling of the compost container.

The compost and sap compartment shell 12 and sap pit 28 should also be constructed with reinforced concrete of at least 3 inches in thickness. A galvanized 4 inch couplding should be installed in the lower portion of the sap compartment up front. The 4-inch coupling should be reduced to allow connecting of a smaller sized valve 26 of approximately 1½ inches.

Referring to FIG. 2, the inner container 27 of the compost compartment may be made from galvanized steel or strong fiber-glass. The inner container 27 should be approximately 6 feet high and have a 2 ft. square door. Both doors on the inner container and outer shell should be located in conjunction with each other. The inner container 27 is provided with 1-inch holes on the bottom and side with the holes being spaced about 3 inches apart. The inner container 27 will have no top cover.

Figure 3:
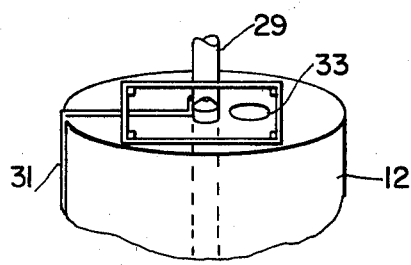
FIG. 3 is a partial view of the composting container of FIG. 1 wherein the equipment has been modified to provide means for exhausting air and water vapor.
Figure 4:
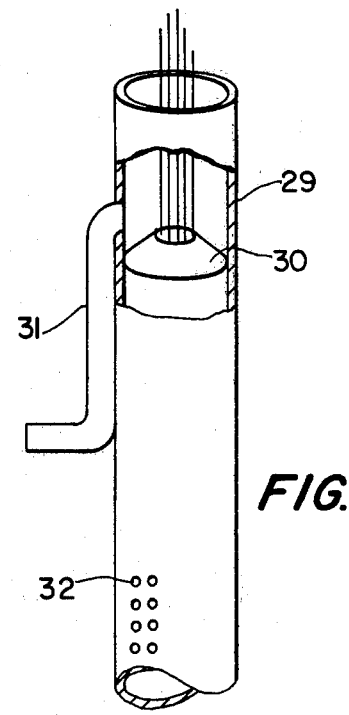
FIG. 4 is an enlarged view of a portion of FIG. 3.

Reference is made to FIGS. 3 and 4 which disclose a water vapor separator which is used to prevent condensed water vapor from running back down into the compost compartment. This is essential to maintaining the efficiency of the hot fermenting decomposing process taking place in container 12. FIG. 3 is a view showing the location of the water vapor separator in the center of the upper portion of the composting compartment 12. The water vapor separator comprises a pipe means 29 for exhausting air and water vapor from compartment 12. The exhaust pipe means 29 has means to prevent condensed water vapor from flowing back into compartment 12. As best seen in FIG. 4 the latter means comprises a perforated conical member 30 extending across the interior of the upper portion of pipe 29. Furthermore, as seen in FIG. 4, means 31 is provided for draining condensed water away from the perforated conical member 30. As best seen in FIG. 4, the pipe 29 is provided with perforations 32 in the lower portion of pipe 29 which extends downwardly into the interior of composting compartment 12. As seen in FIG. 3, the inlet for conduit 13 is repositioned at 33 in the top of the compost compartment.

While preferred embodiments of the present invention have been desscribed in detail and illustrated in the accompanying drawings, it is to be understood that the present invention is susceptible of embodiments which differ in detail from the disclosed embodiments in that various refinements and omissions differing from the disclosed embodiments may be adopted without, however, departing from the spirit and scope of the present invention.

I claim:

1. An apparatus for aerobic biological transformation of human waste material comprising:
(a) an aerobic composting compartment for holding said waste during aerobic biological transformation, said compartment having upper inlet and upper outlet means;
(b) a waterless toilet adapted to receive deposited human waste;
(c) a cup-shaped paper receptacle, associated with said waterless toilet, having a cup portion and a cone portion, said cup portion being fabricated from a limited water absorbing material and said cone portion being fabricated from a water absorbing material, means for inserting said cup-shaped receptacle into said waterless toilet prior to depositing said human waste, said cup portion containing said human waste;
(d) a first conduit, coupling said waterless toilet to said composting compartment inlet means, for transporting said cup-shaped paper receptacle containing said human waste from said toilet to said composting compartment, said cone portion wiping said first conduit interior clean as it traverses through said conduit;

(e) vacuum generating means, associated with said first conduit means, for creating a vacuum within said first conduit means thereby transporting said cup-shaped paper receptacle from said toilet to said composting compartment;

(f) funnel means communicating with said first conduit for injecting decomposable garbage, cut grass, weeds, leaves and the like into said composting compartment thereby facilitating the decomposition of said human waste; and (g) an exhaust conduit, connected to said composting compartment outlet means, for exhausting air and water vapor from said composting compartment; and (h) a water vapor separator, associated with said exhaust conduit, for preventing condensed water vapor running back down the interior of said exhaust conduit into said composting compartment.

2. The apparatus of claim 1 wherein said cup portion includes a flat head portion.

3. The apparatus of claim 1 wherein said cup portion includes a conical shaped head portion.

4. The apparatus of claim 1 wherein said water vapor separator includes (a) a perforated conical member circumfentially abutting the interior of said exhaust conduit; and (b) a second conduit, disposed adjacent the top surface of said conical member, for draining the condensed water to a point remote from said exhaust conduit.

* * * * *